(12) United States Patent
Ramsay et al.

(10) Patent No.: US 8,570,161 B2
(45) Date of Patent: Oct. 29, 2013

(54) SYSTEMS AND METHODS FOR HAPTIC INFORMATION PREVIEW (75) Inventors: Erin Ramsay, Dollard-des-Ormeaux (CA); Juan Manuel Cruz-Hernandez, Montreal (CA); Ali Modarres, Montreal (CA)

(73) Assignee: Immersion Corporation, San Jose, CA (US)

( * ) Notice: Subject to any disclaimer, the term of this patent is extended or adjusted under 35 U.S.C. 154(b) by 264 days.

(21) Appl. No.: 13/046,246

(22) Filed: Mar. 11, 2011

(65) Prior Publication Data
US 2012/0056733 A1 Mar. 8, 2012

Related U.S. Application Data (60) Provisional application No. 61/314,333, filed on Mar. 16, 2010.

(51) Int. Cl.
G08B 6/00 (2006.01)
G09B 21/00 (2006.01)
H04B 3/36 (2006.01)

(52) U.S. Cl.
USPC .................................... 340/407.2; 340/407.1

(58) Field of Classification Search
USPC .............. 340/407.2, 407.1; 455/566; 345/173
See application file for complete search history.

(56) References Cited

U.S. PATENT DOCUMENTS

| | | | |
|---|---|---|---|
| 7,336,260 B2 * | 2/2008 | Martin et al. ................. | 345/169 |
| 8,077,019 B2 * | 12/2011 | Hofmann et al. .......... | 340/407.1 |
| 8,315,652 B2 * | 11/2012 | Grant et al. .................... | 455/466 |
| 8,316,166 B2 * | 11/2012 | Grant et al. ..................... | 710/73 |
| 2005/0184696 A1 | 8/2005 | Anastas et al. | |
| 2007/0057913 A1 | 3/2007 | Eid et al. | |
| 2009/0021473 A1 * | 1/2009 | Grant et al. ................... | 345/156 |
| 2010/0079263 A1 * | 4/2010 | Anabuki et al. ............ | 340/407.1 |
| 2010/0288072 A1 | 11/2010 | Springer et al. | |

FOREIGN PATENT DOCUMENTS

| EP | 2 141 569 A2 | 1/2010 |
|---|---|---|
| WO | WO 2010/009163 A1 | 1/2010 |

OTHER PUBLICATIONS

International Preliminary Report on Patentability mailed Sep. 18, 2012 for corresponding International Application No. PCT/US2011/028061.

MacLean, K. et al., "Smart Tangible Displays in the Everyday World: A Haptic Door Knob," XP-002640738, In: Proceedings of the IEEE/ASME Intl. Conf. on Advanced Intelligent Mechatronics (AIM'99), Atlanta, GA, Sep. 1999.

Patent Cooperation Treaty, International Search Report and Written Opinion, International Application No. PCT/US2011/028061, mailed Jul. 1, 2011.

* cited by examiner

*Primary Examiner* — Toan N Pham
(74) *Attorney, Agent, or Firm* — Kilpatrick Townsend & Stockton LLP (57) ABSTRACT

Systems and methods for haptic information preview are disclosed. For example, in one embodiment a method for haptic information preview includes: receiving a message including data; receiving a data quality metric associated with the data; determining a quality of the data based at least in part on the data quality metric; determining a haptic effect based at least in part on the data quality; and transmitting a signal corresponding to the haptic effect to a haptic effect generator configured to output the haptic effect. Another embodiment includes a computer-readable medium comprising processor-executable code for executing such a method.

27 Claims, 7 Drawing Sheets

SYSTEMS AND METHODS FOR HAPTIC INFORMATION PREVIEW

CROSS-REFERENCE TO RELATED APPLICATION

This patent application claims priority to U.S. Provisional Patent Application No. 61/314,333, entitled "Systems and Methods for Haptic Information Preview," filed Mar. 16, 2010, which is incorporated by reference herein in its entirety.

FIELD OF THE INVENTION

The present invention generally relates to haptic feedback and more particularly to systems and methods for haptic information preview.

BACKGROUND

In recent years, the use of handheld devices of all types has grown exponentially. These devices are used as portable organizers, telephones, music players, and gaming systems. Many modern handheld devices now incorporate some type of haptic feedback. New methods for using this haptic feedback are needed.

SUMMARY

Embodiments of the present invention provide systems and methods for haptic information preview. For example, in one embodiment a method for haptic information preview comprises: receiving a message comprising data; receiving a data quality metric associated with the data; determining a quality of the data based at least in part on the data quality metric; determining a haptic effect based at least in part on the data quality; and transmitting a signal corresponding to the haptic effect to a haptic effect generator configured to output the haptic effect. Another embodiment comprises a computer-readable medium comprising processor-executable code for executing such a method.

These illustrative embodiments are mentioned not to limit or define the invention, but rather to provide examples to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Embodiments of the present invention provide systems and methods for haptic information preview.

Illustrative Embodiment of Haptic Information Preview

One illustrative embodiment of the present invention comprises a messaging device, such as a mobile phone. In the illustrative embodiment, the messaging device comprises the Samsung Haptic Phone (SCH-W420) equipped with Immersion Corporation's TouchSense® 3000, TouchSense® 4000, or TouchSense® 5000 vibrotactile feedback systems, formerly known as Immersion Corporation's VibeTonz® vibrotactile feedback system. In other embodiments, different messaging devices and haptic feedback systems may be utilized.

The illustrative messaging device comprises a display, a speaker, a network interface, a memory, and a processor in communication with each of these elements. The illustrative messaging device also comprises a manipulandum and a haptic effect generator, both of which are in communication with the processor. The manipulandum is configured to sense a user's interaction with the messaging device, and the haptic effect generator is configured to output a haptic effect.

In the illustrative embodiment, the display is configured to display a graphical user interface. The graphical user interface comprises an inbox, which stores messages such as text messages, e-mails, or other types of messages. When the user receives a message, such as an e-mail or text message, the processor compares the message to a data quality metric.

In the illustrative embodiment, the data quality metrics are metrics that the processor uses to rank the importance of messages. For example, in the illustrative embodiment, the user may assign a data quality metric associated with the sender of the message. This data quality metric may be positive or negative, for example the user may assign a data quality metric that defines all messages from one sender as high quality and all messages from another sender as low quality. Further, in the illustrative embodiment the user may add additional data quality metrics. For example, a user may define a data quality metric associated with the type of attachment included with a message, or a data quality metric based on the number of times that specific words appear in a message. In the illustrative embodiment the user may define one, or a combination of many data quality metrics.

In the illustrative embodiment, the user may assign data quality metrics in a variety of ways. For example, a user could select a message and click a button to display a menu. The menu could present an "assign quality" choice to the user.

When he or she selects the "assign quality" choice, the user is presented with numbers or measures of quality from which to select. When the user clicks on one of the choices (e.g., 4), the quality metric 4 is assigned to the message. In another embodiment, the user could select a menu for assigning quality metrics based on various components of the message. For example, the user may select a menu that allows he or she to assign quality metrics associated with the sender of a message. For example, a user may assign a data quality to all of his or her contacts. For example, the user could assign a data quality metric that defines the data quality of all messages received from a certain sender as 4 or higher. In another embodiment, the user may select a menu that allows the user to assign data quality metrics based on words that appear in a message. For example, the user may assign certain words that appear in a message as of a higher data quality than other words. In such an embodiment, the user may further limit the data quality metrics to be associated with only the subject line, body, or another part of the message.

In the illustrative embodiment, when the user receives a new message, the processor compares the data quality metric to the message to determine the quality of the message. For example, in the illustrative embodiment, a user may assign a data quality metric that assigns a high data quality to all messages that comprise an image and/or certain keywords. In such an embodiment, when the user receives a message with the keywords and/or an attached image, the processor will determine that message has high data quality. In the illustrative embodiment, the same user may assign a data quality metric that defines a low data quality for all messages from a certain sender. Then when the user receives a message from that sender, the processor will determine that the message has a low data quality.

Once the processor has assigned a data quality to a message, the processor will determine a haptic effect. For example, if the user receives a message that the processor determines has a very low data quality, the processor may output no haptic effect. In such an embodiment, if the user receives a message with a medium data quality, the processor may determine a short pulsing haptic effect. Finally, in such an embodiment, if the user receives a message with a high data quality, the processor may determine a haptic effect that does not stop until the user checks the message.

Finally, the processor transmits a signal corresponding to the determined haptic effect to a haptic effect generator configured to output the haptic effect. This haptic effect provides the user with an indication of the data quality of the message. Thus, the user can quickly determine whether a message requires immediate attention without looking at the contents of the message. The user of the illustrative device saves time because the user does not have to look at a messaging device to determine that he or she received an unimportant or "junk" message.

This illustrative example is given to introduce the reader to the general subject matter discussed herein. The invention is not limited to this example. The following sections describe various additional non-limiting embodiments and examples of systems and methods for haptic information preview.

Illustrated System for Haptic Information Preview

Figure 1:
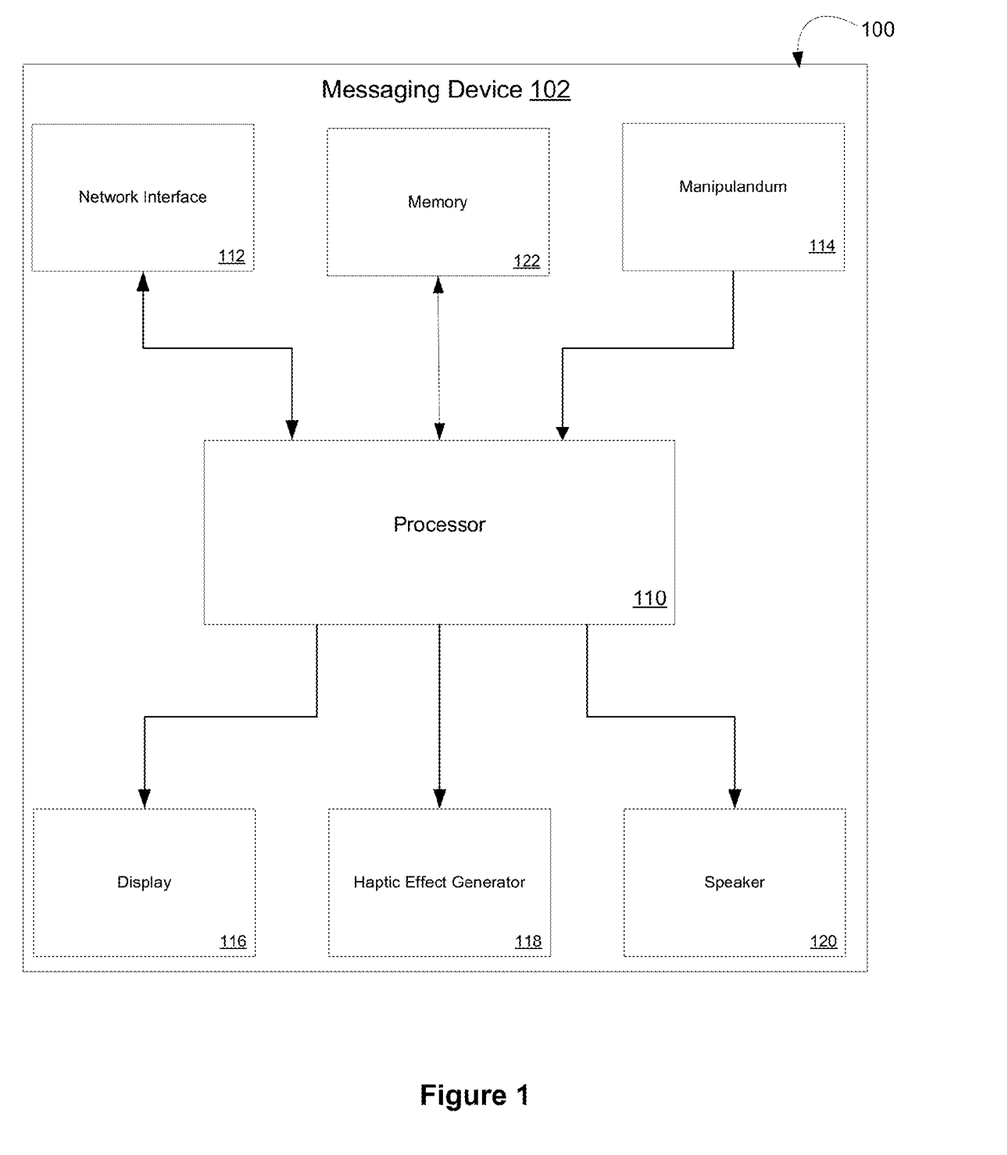
FIG. 1 is a block diagram of a system for haptic information preview according to one embodiment of the present invention.

Referring now to the drawings in which like numerals indicate like elements throughout the several figures, FIG. 1 is a block diagram of a system for haptic information preview according to one embodiment of the present invention. As shown in FIG. 1, the system 100 comprises a messaging device 102, such as a mobile phone, portable digital assistant (PDA), portable media player, or portable gaming device. The messaging device 102 comprises a processor 110 in communication with a network interface 112, a manipulandum 114, a display 116, a haptic effect generator 118, a speaker 120, and a memory 122. The processor 110 is configured to generate a graphical user interface, which is shown on display 116.

The processor 110 is configured to execute computer-executable program instructions stored in memory 122. For example, processor 110 may execute one or more computer programs for messaging or for generating haptic feedback. Processor 110 may comprise a microprocessor, a digital signal processor (DSP), an application-specific integrated circuit (ASIC), one or more field programmable gate arrays (FPGAs), or state machines. Processor 110 may further comprise a programmable electronic device such as a programmable logic controller (PLC), a programmable interrupt controller (PIC), a programmable logic device (PLD), a programmable read-only memory (PROM), an electronically programmable read-only memory (EPROM or EEPROM), or other similar devices.

Memory 122 comprises a computer-readable medium that stores instructions, which when executed by processor 110, cause processor 110 to perform various steps, such as those described herein. Embodiments of computer-readable media may comprise, but are not limited to, electronic, optical, magnetic, or other storage or transmission devices capable of providing processor 110 with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. In addition, various other devices may include computer-readable media such as a router, private or public network, or other transmission devices. The processor 110 and the processing described may be in one or more structures, and may be dispersed throughout one or more structures.

The processor 110 is in communication with the network interface 112. The network interface 112 may comprise one or more methods of mobile communication, such as infrared, radio, Wi-Fi, or cellular network communication. In other variations, the network interface 112 comprises a wired network interface, such as Ethernet. The messaging device 102 can be configured to exchange messages or virtual message objects with other devices (not shown) over networks such as a cellular network and/or the Internet. Embodiments of messages exchanged between devices may comprise voice messages, text messages, data messages, or other forms of digital messages.

The processor 110 is also in communication with one or more manipulanda 114. The manipulanda 114 may comprise a touch-sensitive input device (e.g. touch-screen, touch-pad), button, switch, scroll wheel, roller ball, or some other type of physical device interface known in the art. In some embodiments, the processor is in communication with a single manipulandum 114, in other embodiments, the processor is in communication with a plurality of manipulanda, for example, a touch-screen and a roller ball. The manipulandum 114 is configured to detect user interaction, and based on the user interaction, transmit signals to processor 110.

In the embodiment shown in FIG. 1, the processor 110 is also in communication with a display 116. The processor 110 can be configured to generate a graphical representation of a user interface to be shown on display 116. In some embodiments, the display 116 may comprise a manipulandum, such as a touch-sensitive interface. In such an embodiment, the touch-sensitive interface may comprise a touch-screen mounted overtop of display 116.

In some embodiments, the signals received from manipulandum 114 may be associated with an interaction with the graphical user interface shown on display 116. For example, in one embodiment, manipulandum 114 may comprise a touch-screen, and the graphical user interface may comprise a virtual keyboard. In such an embodiment, when the user interacts with a section of the touch-screen that overlays one of the keys of the keyboard, the touch-screen sends a signal corresponding to the user interaction to processor 110. Based on this signal, processor 110 will determine that the user has pressed one of the keys on the virtual keyboard. Such an embodiment may further allow the user to interact with other icons and virtual objects on display 116. For example, in some embodiments the user may flick a touch-screen to move a virtual ball, or turn a virtual knob on a touch-screen. In some embodiments, a different type of manipulandum, such as a scroll wheel, roller ball, or button may facilitate similar interactions between the user and the graphical user interface.

As shown in FIG. 1, processor 110 is also in communication with one or more haptic effect generators 118. Processor 110 is configured to determine a haptic effect and transmit a haptic signal corresponding to the haptic effect to haptic effect generator 118. Haptic effect generator 118 is configured to receive a haptic signal from processor 110 and generate the haptic effect. Haptic effect generator 118 may be an actuator, for example, a piezoelectric actuator, an electric motor, an electro-magnetic actuator, a voice coil, a linear resonant actuator, a shape memory alloy, an electro-active polymer, a solenoid, an eccentric rotating mass motor (ERM), or a linear resonant actuator (LRA). In another embodiment, haptic effect generator 118 may comprise an electrostatic generator or electrostatic display configured to generate a haptic effect. For example, in such an embodiment, the haptic effect generator 118 may use one or more films of a capacitive sheet to output a periodic electrostatic charge, which generates a force that attracts the user's finger to a surface of a display or a surface of a touch-sensitive interface, such as a touch-screen, touch-pad, or manipulandum 114. For example, by generating a charge differential between the user's finger and the surface of the display. In some embodiments, this electrostatic force may be configured to control friction between the user's finger and the haptic effect generator. This friction may simulate a texture on the surface of the display, or some other haptic effect.

As shown in FIG. 1, processor 110 is also in communication with speaker 120. Speaker 120 is configured to receive audio signals from processor 110 and output them to the user. In some embodiments, the audio signals may be associated with the haptic effect output by haptic effect generator 118, or the image output by display 116. In other embodiments, the audio signal may not correspond to the haptic effect or the image.

Figure 2A:
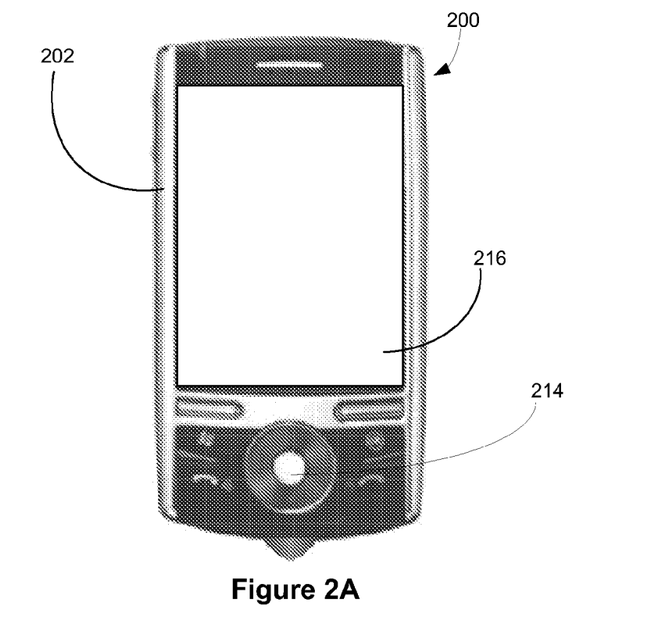
FIG. 2A is an illustrative embodiment of a system for haptic information preview according to one embodiment of the present invention.

FIG. 2A is an illustrative embodiment of a system for haptic information preview according to one embodiment of the present invention. FIG. 2A comprises a mobile device 200, such as a mobile phone, PDA, portable media player, or portable gaming device. The mobile device 200 is configured to send and receive signals, such as voicemail, text messages, and other data messages, over a network such as a cellular network or the Internet. The mobile device 200 may comprise a wireless network interface and/or a wired network interface (not shown in FIG. 2A). Although the device 200 is illustrated as a handheld mobile device in FIG. 2A, other embodiments may comprise different devices, such as video game systems and/or personal computers.

As shown in FIG. 2A, the mobile device 200 comprises a housing 202 and a display 216. In some embodiments, display 216 may comprise an LCD display. In other embodiments, display 216 may comprise a plasma display, or other type of display known in the art. In the embodiment shown in FIG. 2A, display 216 is blank But display 216 is configured to receive display signals from the processor and output them to the user. In some embodiments, the display signals may comprise a graphical user interface, which is displayed to the user via display 216.

Referring still to FIG. 2A, the mobile device 200 further comprises a manipulandum 214. In the embodiment shown in FIG. 2A, the manipulandum 214 comprises a roller ball and buttons. In other embodiments, not shown in FIG. 2A, the manipulanda may comprise a touch-sensitive interface such as a touch-pad or a touch-screen. In an embodiment comprising a touch-screen, the touch-screen may be mounted overtop of display 216. In some embodiments, display 216 and the touch-screen may comprise a single integrated component, such as a touch-screen display.

Manipulandum 214 is configured to detect user interaction and transmit interface signals corresponding to the user interaction to the processor. In some embodiments, the user interaction is associated with a graphical user interface shown on display 216. In such an embodiment, the processor receives the interface signal and, based at least in part on the interface signal, manipulates the graphical user interface. For example, the user may use manipulandum 214 to depress a virtual button displayed on the graphical user interface. In another embodiment, the user may use manipulandum 214 to navigate a set of menus in the graphical user interface.

Figure 2B:
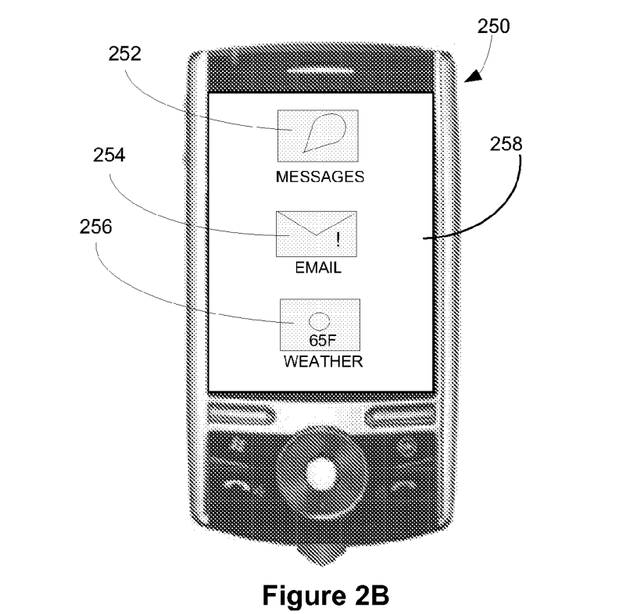
FIG. 2B is an illustrative embodiment of a system for haptic information preview according to one embodiment of the present invention.

FIG. 2B is an illustrative embodiment of a system for haptic information preview according to one embodiment of the present invention. FIG. 2B comprises mobile device 250, which is similar to mobile device 200, shown in FIG. 2A. As shown in FIG. 2B, mobile device 250 comprises a display 258, which comprises three icons, 252, 254, and 256. Each icon comprises a "portal" to a different application on mobile device 250. A portal is a link between an icon and an application. This link may be used to communicate information between the application and the icon. The icon may then communicate this information to the user either visually or via a haptic effect.

In the embodiment shown in FIG. 2B, icon 252 comprises a portal to a text messaging application. When the user interacts with icon 252, the mobile device 250 will open a text messaging application that allows the user to send text messages or view received text messages. Further, the portal allows the text-messaging application to communicate information to icon 252, which may then communicate this information to the user. For example, in one embodiment, when the user receives a text message, icon 252 may further comprise an exclamation point to visually alert the user that there is a new message. In the embodiment shown in FIG. 2B, Mobile device 250 further comprises icon 254, which comprises a portal to an email application, and icon 256, which comprises a portal to a weather monitoring application. In other embodiments, different icons comprising portals to different applications may be used.

In the embodiment shown in FIG. 2B, the user may assign data quality metrics that allow icons 252, 254, and 256 to communicate information to the user via a haptic effect. For example, in one embodiment, the user may assign a data quality metric associated with the number of unread messages in his or her inbox. In such an embodiment, the user may assign a haptic effect that gradually becomes more intense as each unread message accumulates in the inbox. In some embodiments, mobile device 250 may output the haptic effect as soon as a message arrives. In other embodiments, mobile device 250 may output the haptic effect only when the user interacts with icon 252. For example, mobile device 250 may determine a haptic effect associated with the number of unread messages in the user's inbox when a new message arrives, but not output the haptic effect until the user interacts with icon 252. In another embodiment, the user may assign a data quality metric associated with the importance of the sender of the message. In such an embodiment, the mobile device may output a haptic effect that allows the user to quickly determine that the user has received a message from an important sender. In other embodiments, the user may assign different data quality metrics, for example metrics associated with the time the message was sent, the number of messages from a sender, keywords in the message, attachments to the message, or some other factor known in the art.

In other embodiments, the user may define data quality metrics associated with other functions. For example, the user may assign data quality metrics associated with the email application linked to icon 254. In such an embodiment, the user may assign data quality metrics associated with factors of emails in the user's inbox. For example, data quality metrics associated with keywords in the email's subject line, body, or attachments. In other embodiments, the user may assign data quality metrics to applications that are not associated with user to user messaging, for example, the user may assign data quality metrics associated with the weather monitoring application linked to icon 256. In such an embodiment, the user may assign a data quality metric associated with severe weather. When the weather monitoring application determines that there is a severe weather alert in the area, the mobile device may determine a haptic effect. In some embodiments, mobile device 200 may output this haptic effect as soon as the weather monitoring application determines that there is a severe weather alert in the area. In other embodiments, mobile device 200 may output the haptic effect only when the user interacts with icon 256. In other embodiments, the messaging device may comprise additional icons that comprise portals to different applications, and the user may assign data quality metrics associated with those applications.

Figure 3:
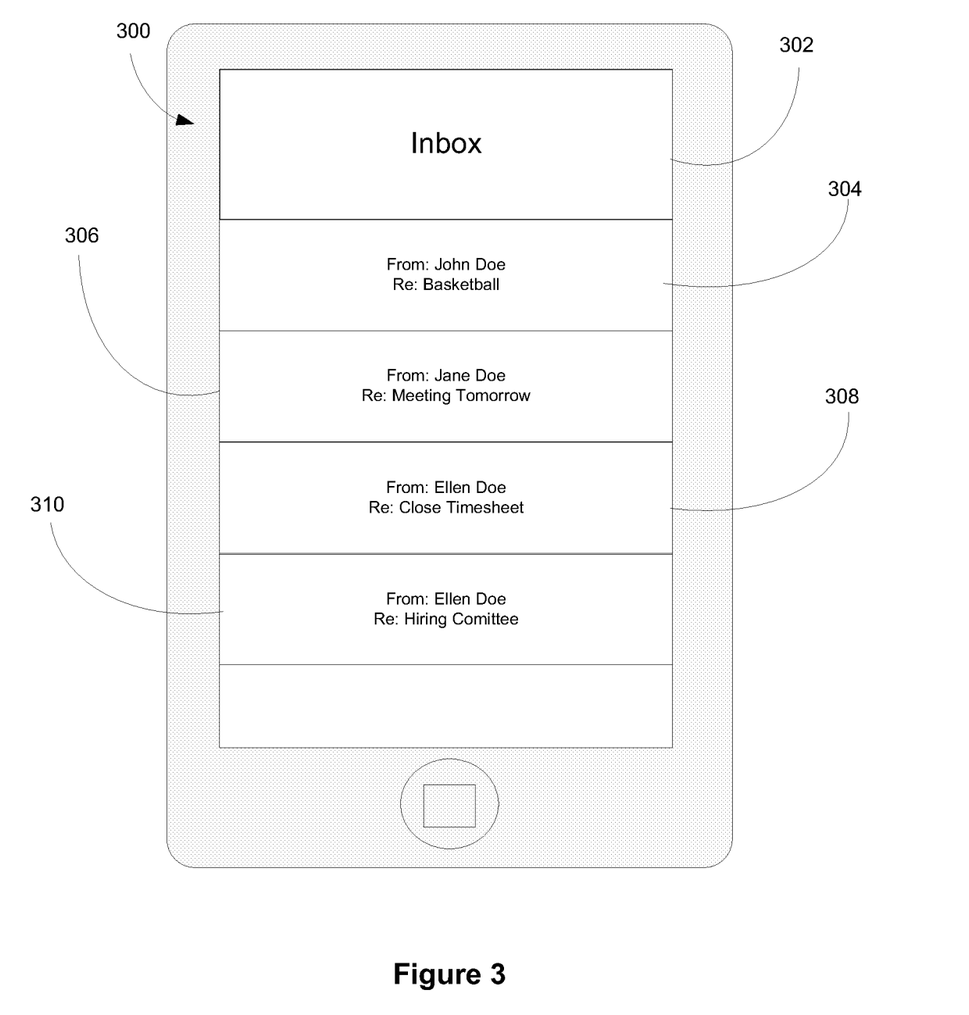
FIG. 3 is an illustration of a system for haptic information preview according to one embodiment of the present invention.

FIG. 3 is an illustration of a system for haptic information preview according to one embodiment of the present invention. FIG. 3 shows system 300, which comprises an inbox 302. Inbox 302 is configured to be displayed on a display (not shown in FIG. 3). In the embodiment shown, inbox 302 comprises four messages, in some embodiments these messages may comprise text messages, e-mail messages, voicemail messages, instant messages, chat messages, or other messages known in the art. When the mobile device receives a new message, the mobile device's processor compares the new message to a user-defined data quality metric. Based on this comparison the processor determines the data quality of the message. Then, based on the data quality of the message, the processor generates a haptic effect.

In some embodiments, the data quality metrics are defined by the user and stored by the processor. In other embodiments, the data quality metrics come preloaded on the messaging device as default settings. In still other embodiments, the processor may download the data quality metrics via a network interface. In some embodiments, the processor may store the data quality metrics in a local data store on the device. In other embodiments, the processor may store the data quality metrics on an external data store accessed via a network interface. A user may define data quality metrics based on any part of the message. For example, in one embodiment, the user may click on a menu to assign data quality metrics. In some embodiments, the menu may allow the user to assign data quality metrics based on a variety of factors associated with the message. For example, in one embodiment, the user may define a data quality metric associated with the sender of the message. The user may assign a data quality metric to each person stored in their contacts. In some embodiments, these quality metrics may be simple, for example, categorizing users as important or unimportant. In another embodiment, these quality metrics may be more complex, for example assigning users a range of importance. For example, assigning senders a value between 1 and 100, where 1 is the least important, and 100 is the most important.

In some embodiments, the user of the mobile device may further define other data quality metrics. For example, the user may enter a menu that allows the user to define data quality metrics associated with the subject line or body of a message. In such an embodiment, the graphical user interface may display a menu that allows the user to define keywords that are associated with the data quality of a message. For example, the user may define the word "time" as highly important, and define the word "basketball" as of less importance. In such an embodiment, when the user receives a message that comprises the word "time," the processor will assign that message a higher importance than another message that comprises the word "basketball." In still embodiments, the user may define data quality metrics associated with the subject line of a message and additional data quality metrics associated with the body of the text message.

In other embodiments, the user may enter an interface, such as a graphical user interface or menu that allows the user to assign data quality metrics associated with other characteristics of a message. In such an embodiment, the user may enter the menu by pressing a keyboard shortcut, or by gesturing within the virtual physical space. The graphical user interface may display a menu that allows the user to define a data quality metric associated with a message, for example, a data quality metric associated with whether the message has an attachment. Further, the user may assign a message comprising an attachment a higher importance than a message that does not comprise an attachment. In another embodiment, the user may assign a quality metric that defines video attachments as more important than image attachments. In another embodiment, the user may assign a data quality metric associated with the contents of the attachment. For example, a user may define an attachment comprising an audio file that contains speech as having a higher data quality metric than an attachment comprising an audio file that contains music. In other embodiments, data quality metrics may be associated with other characteristics of the message, for example, the time of day the message was received, the recipient's location, the sender's location, or any other characteristic associated with the message.

In some embodiments, the processor is configured to reverse engineer data quality metrics from messages that the user has categorized by data quality. For example, in such an embodiment, the user may rank a message's data quality on a scale from one to ten, or one to one-hundred. In such an embodiment, a user may select a message and click a button to display a menu. The menu could present an "assign quality" choice to the user. When the user selects an "assign quality" choice, he or she is presented with numbers or measures of quality from which to select. When the user clicks on one of the choices (e.g., 4 of 10), the quality metric 4 is assigned to the message. Based on the data quality that the user assigns to each message, the processor may determine a data quality metric. For example, if the user categorizes a set of messages from a sender with a low data quality, then the processor may determine and store a data quality metric that defines messages from that sender as having a low data quality. In some embodiments, the processor may search for other similarities between messages to create data quality metrics, for example: whether messages comprise an attachment, words that consistently appear in high/low quality messages, or types of attachments that are consistently found in high/low quality messages. The processor may use these similarities to determine new data quality metrics. Then the processor may use these data quality metrics to determine the data quality of new messages.

After the processor determines the data quality, it determines a haptic effect based at least in part on the data quality. For example, in one embodiment, if a message has a low data quality, the processor may determine no haptic effect. In such an embodiment, when the user receives a message with a medium data quality the processor may determine a gentle haptic effect that ends after a few seconds. In the same embodiment, when the user receives a message with a high data quality, the processor may determine a strong haptic effect that continues until the user views the message. In some embodiments, the processor may not output the haptic effect until the user is interacting with manipulandum 114. In such an embodiment, the processor may not output the haptic effect until the user has used manipulandum 114 to move an indicator on the graphical user interface overtop of an icon representing inbox 302.

Referring again to FIG. 3, inbox 302 comprises four messages. Message 304 is from John Doe, and its subject is "Basketball;" message 306 is from Jane Doe, and its subject is "Meeting Tomorrow;" message 308 is from Ellen Doe, and its subject is "Close Timesheet;" and message 310 is from Ellen Doe, and its subject is "Hiring Committee." In the embodiment shown in FIG. 3, the user could define any number of data quality metrics that will lead the processor to determine different data quality values for each message. For example, a user may assign data quality metrics that define all messages from Ellen Doe as low quality, all messages from John Doe as high quality, and all messages containing the word "Meeting" as medium quality. In such an embodiment, the processor may assign a high data quality value to message 304, because it is sent by John Doe. The processor may further assign a medium data quality value to message 306 because it contains the word "Meeting." But the processor may assign a low data quality value to messages 308 and 310 because each of these messages is sent by Ellen Doe. Based on these determinations the processor may determine a strong haptic effect when messages 304 and 306 are received and a weak haptic effect, or no haptic effect, when messages 308 and 310 are received. In other embodiments, the user may define different data quality metrics that cause the messages to be assigned different data qualities.

In some embodiments, the user may assign data quality metrics that conflict. For example, the user may assign a data quality metric that specifies that all messages from Ellen Doe are low quality. But the same user may also define a data quality metric that defines all messages that contain the words "Hiring Committee" as high quality. In such an embodiment, when the device receives message 310 there is a conflict because it is sent by Ellen Doe and also contains the words "Hiring Committee." In such an embodiment, the processor may average the two data quality metrics to determine that the message has a medium data quality. In another embodiment, the processor may determine that one of the data quality metrics overrides the other data quality metric, and thus the message has either a high or low data quality.

Illustrative Methods for Haptic Information Preview

Figure 4:
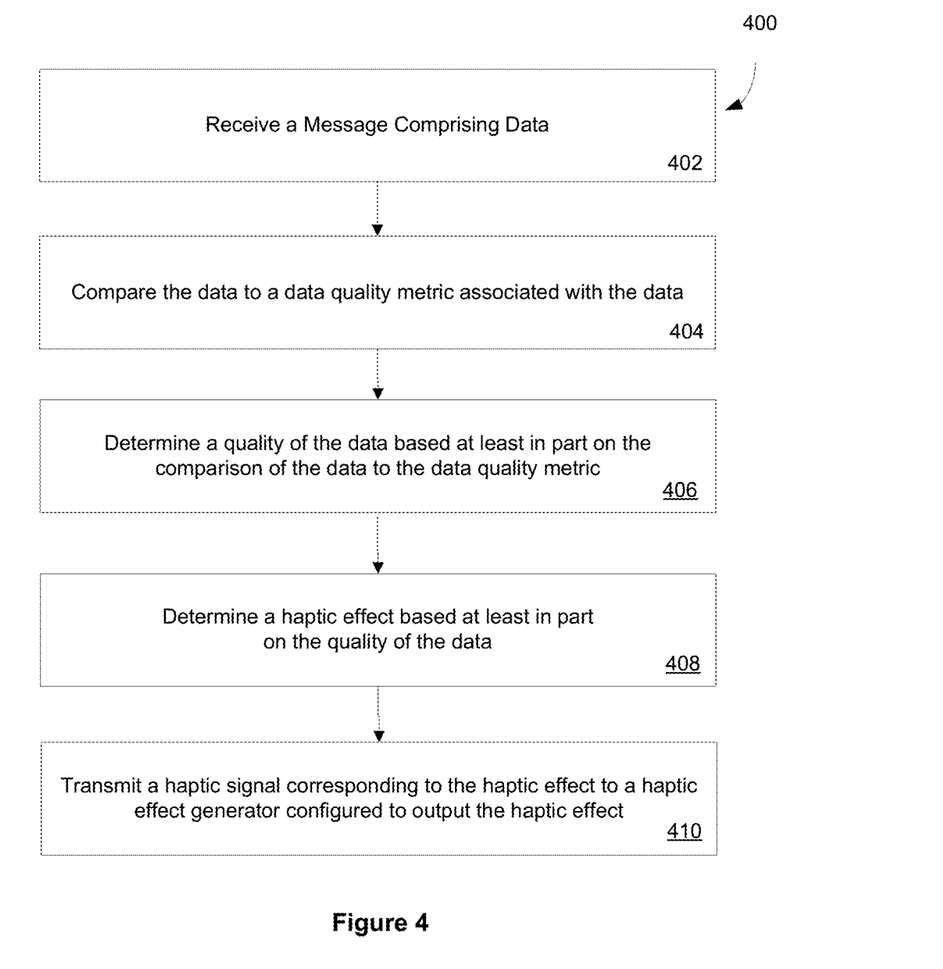
FIG. 4 is a flow chart for a method of haptic information preview according to one embodiment of the present invention.

FIG. 4 is a flow chart for a method of haptic information preview according to one embodiment of the present invention, which is discussed with respect to the device shown in FIG. 1. The method 400 begins when processor 110 receives a message comprising data 402. In some embodiments, processor 110 receives the message via network interface 112. In such an embodiment, the message may comprise data such as a text message, e-mail, or voice message. In some embodiments, this message further comprises an attached file, such as an audio, video, image, or text file. In another embodiment, processor 110 receives the message comprising data from a sensor. In such an embodiment, the sensor may be an audio sensor, a temperature sensor, a speed sensor, an optical sensor, or some other sensor known in the art.

Next, processor 110 compares the data to a data quality metric associated with the data 404. In some embodiments, the data quality metric may be stored in a local data store such as memory 122. In other embodiments, the data quality metric may be stored on an external data store and transmitted to processor 110 via network interface 112. In an embodiment where the data comprises a message, the data quality metric may comprise a measure of the importance of the sender. For example, in such an embodiment one sender may be associated with a high data quality metric, while another sender is associated with a low data quality metric. In some embodiments, the user of the mobile device may further define other data quality metrics. For example, the user may define a data quality metric associated with the subject line or body of a message. In such an embodiment, the user may define certain keywords as indicative of data quality. Further, the data quality metric may be associated with the attachment to the message, for example the type of attachment, or the contents of the attachment itself. In some embodiments, the processor may apply many data quality metrics to the data; in other embodiments the processor may apply a single data quality metric to the data.

In an embodiment wherein processor 110 receives the data from a sensor, the data quality metric may be associated with the type of sensor. For example, in an embodiment wherein the sensor comprises a fuel gauge, the data quality metric may be associated with a fuel level. In another embodiment, the sensor may comprise an optical sensor. In such an embodiment, the optical sensor may comprise facial recognition software, and the data quality metric may be associated with certain known faces. For instance, a well-known face would be associated with a relatively higher data quality metric (e.g., 9 out of 10) while a lesser known face would be associated with a relatively lower data quality metric. In another embodiment, the sensor may be associated with a speedometer. In such an embodiment the data quality metric may be associated with speed. In yet another embodiment, the sensor may be a thermometer. In such an embodiment, the data quality metric must be associated with temperature. In some embodiments, the data quality metric may be associated with a combination of factors. For example, in one embodiment, the data quality metric may be associated with both speed and temperature.

Then, once the processor 110 has compared the data to a data quality metric, the processor 110 determines a measure of data quality based, at least in part, on the comparison of the data to the data quality metric 406. In some embodiments, determining a measure of data quality may comprise a Boolean comparison. For example, if the data comprises a message and the data quality metric comprises a data quality measure associated with the sender of the message, then the data quality will be the value that the user previously associated with that sender. In other words, the user first associates data quality values to one or more of the user's contacts, and then when one of those contacts subsequently sends a message to the user, the data quality value of the sender is also associated with the sender's message. In other embodiments, the data quality may be determined by the number of times a certain word appears in a message. For example, a message that comprises the word "fired" eight times may have a higher data quality metric than a message that comprises the word "fired" only once. Other similar measures, such as inverse document frequency may also be utilized by embodiments of the present invention.

In some embodiments, the user may assign data quality metrics that conflict. For example, in one embodiment, the user may assign a data quality metric that specifies that all messages from a sender are low quality. But the same user may also assign a data quality metric that specifies that all messages that contain certain words are of high quality. If a message from the low-quality sender includes high-quality words, then the measure of data quality will conflict. In such an embodiment, processor 110 may average the two data quality metrics to determine that the message has a medium data quality. In another embodiment, the processor may determine that one of the data quality metrics overrides the other data quality metric, and thus the message has either a high or low data quality. For instance, a user may associate a weight with some or all of the data quality metrics to allow the processor 110 to resolve such conflicts.

Next, processor 110 determines a haptic effect based at least in part on the data quality 408. In some embodiments, processor 110 compares the data quality to a data quality threshold to determine the haptic effect. For example, in some embodiments, processor 110 may return a data quality that ranges from 0-10. In such an embodiment, the user may define a strong haptic effect for data qualities of 9 or 10, a medium haptic effect for data qualities of 6, 7, or 8, a weak haptic effect for data qualities of 4 or 5, and no haptic effect for data qualities below 4. In such an embodiment, processor 110 will determine the haptic effect that corresponds to the quality of the received data. For example, in such an embodiment if the received data has a quality of 9, the processor will determine a strong haptic effect. In such an embodiment, if the received data has a quality of 3, processor 110 will determine no haptic effect. In some embodiments, the data quality thresholds are default values. In other embodiments, the user defines the values of the thresholds. In some embodiments, processor 110 may modify other aspects of the haptic effect based on the comparison to the threshold value. For example, processor 110 may determine a longer or shorter haptic effect based on the comparison of the data quality to the threshold. For example, in one embodiment, for data of the highest quality, the processor may determine a haptic effect that does not stop until the user checks the message.

Finally, processor 110 transmits a haptic signal corresponding to the haptic effect to haptic effect generator 118, which is configured to output the haptic effect 410. In some embodiments, haptic effect generator 118 may be an actuator, for example, a piezoelectric actuator, an electric motor, an electro-magnetic actuator, a voice coil, a linear resonant actuator, a shape memory alloy, an electro-active polymer, a solenoid, an eccentric rotating mass motor (ERM), or a linear resonant actuator (LRA). In some embodiments, haptic effect generator 118 may be placed inside manipulandum 114. In such an embodiment, haptic effect generator 118 may not output the haptic effect unless the user is in contact with manipulandum 118. In another embodiment, haptic effect generator 118 may comprise an electrostatic generator or electrostatic display configured to generate a haptic effect. For example, in such an embodiment, the haptic effect generator 118 may use one or more films of a capacitive sheet to output a periodic electrostatic charge, which generates a force that attracts the user's finger to a surface of a display or a surface of a touch-sensitive interface, such as a touch-screen, touch-pad, or manipulandum 114. For example, by generating a charge differential between the user's finger and the surface of the display. In some embodiments, this electrostatic force may be configured to control friction between the user's finger and the haptic effect generator. This friction may simulate a texture on the surface of the display, or some other haptic effect.

Illustrated Embodiments of Systems for Haptic Information Preview

Figure 5:
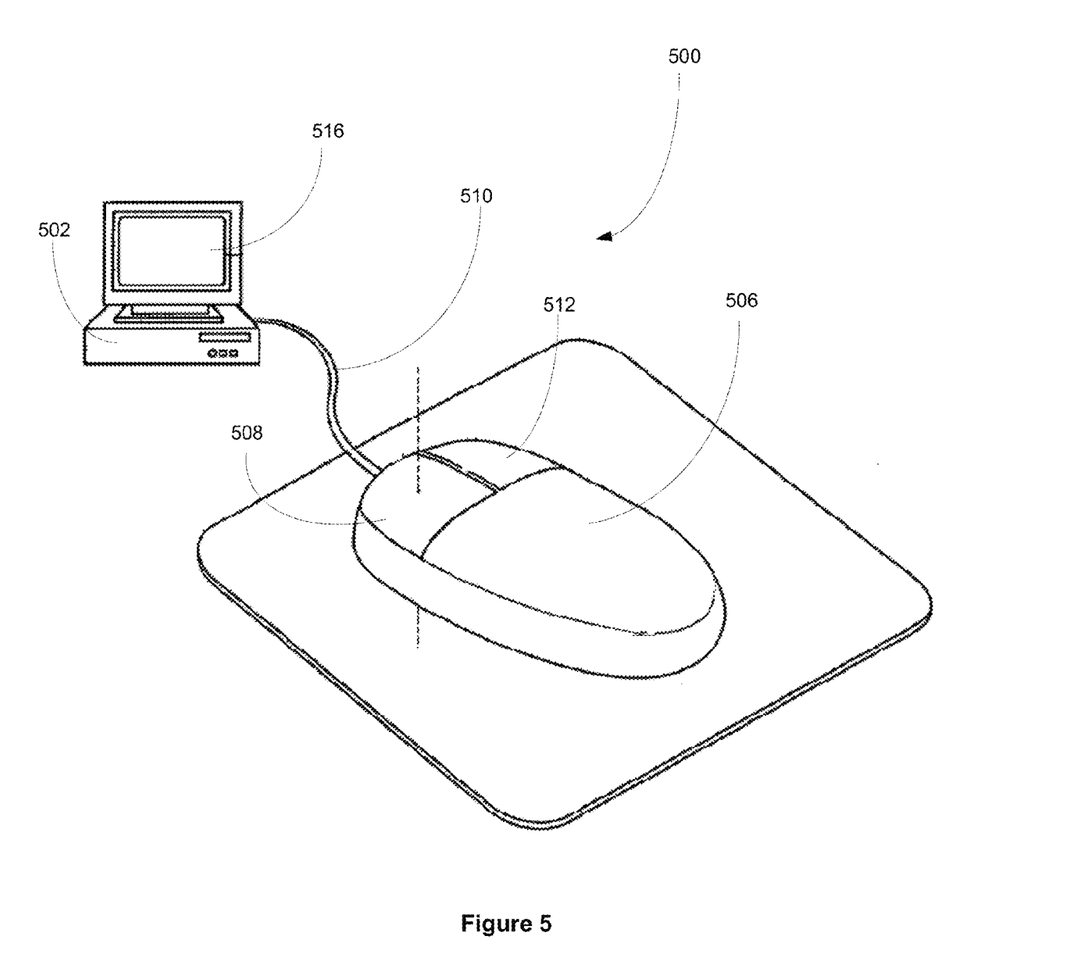
FIG. 5 is an illustration of a system for haptic information preview according to one embodiment of the present invention.

FIG. 5 is an illustration of a system for haptic information preview according to one embodiment of the present invention. As shown in FIG. 5, the system 500 comprises a computer 502, display 516, and haptic mouse 506. In one embodiment the computer 502 comprises a network interface and memory (not shown in FIG. 5). Haptic mouse 506 comprises a haptic effect generator configured to output a haptic effect (not shown in FIG. 5). Haptic mouse 506 communicates with the processor via cable 510. For example, haptic mouse 506 may transmit a sensor signal to the processor via cable 510, while the processor transmits haptic signals to the haptic effect generator via the same cable.

In the embodiment shown in FIG. 5, the processor is configured to generate a graphical user interface that is displayed to the user via display 516. In the embodiment shown in FIG. 5, haptic mouse 502 comprises a left button 508, and a right button 512. When the user presses either of these buttons, they are configured to transmit a corresponding signal to the processor. Haptic mouse 502 further comprises a motion sensor such as a laser motion sensor or mechanical motion sensor (not shown in FIG. 5). The motion sensor is configured to detect the haptic mouse's motion, and send a signal corresponding to this motion to the processor. Based on signals received from the motion sensor and buttons 508 and 512, the processor may modify the graphical user interface shown on display 516. For example, in some embodiments, the user may manipulate a pointer on the graphical user interface by moving haptic mouse 506. In such an embodiment, the user may move the pointer over a virtual object, and click one of buttons 508 or 512 to select the object. Once selected, the user may move the object to another location in the graphical user interface, and then click the same button again to release the object. In some embodiments (not shown in FIG. 5), haptic mouse 502 may comprise additional manipulanda, including but not limited to: a roller ball, scroll wheel, touch-pad, or additional buttons.

Haptic mouse 502 is configured to receive a haptic signal from the processor, and in response, output a haptic effect to the user. In order to generate the haptic effect, haptic mouse 502 comprises a haptic effect generator. For example, in some embodiments the haptic effect generator may comprise: a piezoelectric actuator, an electric motor, an electro-magnetic actuator, a voice coil, a linear resonant actuator, a shape memory alloy, an electro-active polymer, a solenoid, an eccentric rotating mass motor (ERM), a linear resonant actuator (LRA), or an electrostatic display. The haptic effect generator is configured to receive a haptic signal from the processor, and in response, output a haptic effect. The haptic effect may comprise any type of haptic effect known in the art.

For example, in one embodiment the haptic effect may comprise vibrations of varying length, frequency, and intensity. In another embodiment, the haptic effect may comprise a pop that substantially approximates a ball dropping or hammer hitting a nail.

In the embodiment shown in FIG. 5, computer 502 is configured to receive messages such as e-mails or instant messages via a network connection. Once the message is received, the processor compares the message to a data quality metric. Then, based on this comparison, the processor determines a data quality associated with the received message. The processor then uses this data quality to determine a haptic effect associated with the data quality. Then, the processor transmits a haptic signal to the haptic effect generator which outputs the haptic effect to the user.

In some embodiments, the processor may not transmit the haptic signal to the haptic effect generator until the user is moving haptic mouse 506. In other embodiments, the processor may not transmit the haptic signal until the user moves haptic mouse 506 into a position such that a pointer on the graphical user interface is placed overtop of an icon. For example, in such an embodiment the icon may be an "Inbox" icon.

Figure 6:
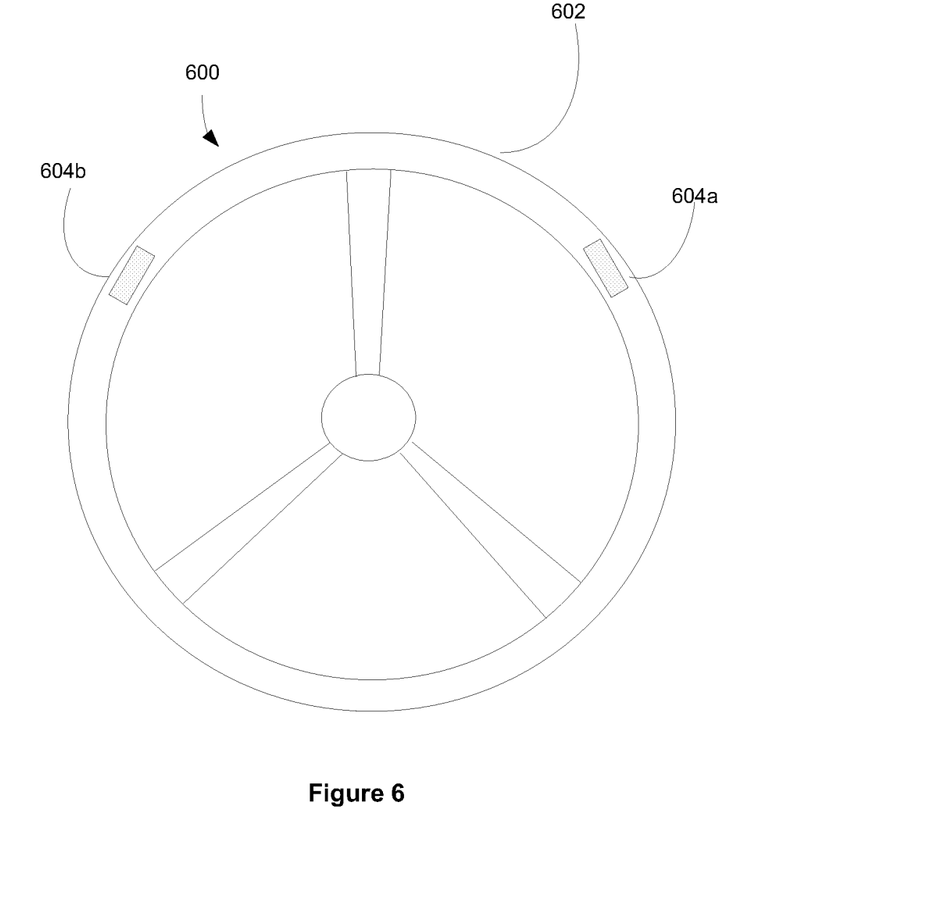
FIG. 6 is an illustration of a system for haptic information preview according to one embodiment of the present invention.

FIG. 6 is an illustration of a system for haptic information preview according to one embodiment of the present invention. As shown in FIG. 6, the system 600 comprises a haptic steering wheel 602. In one embodiment, the haptic steering wheel may be configured to operate as a steering wheel for a car, all-terrain vehicle, boat, or other vehicle that has a steering wheel for direction control. In such an embodiment, the user may turn the haptic steering wheel to the left to turn the vehicle to the left, and the user may turn the haptic steering wheel to the right to turn the vehicle to the right.

The haptic steering wheel comprises a processor that is configured to receive a message comprising sensor data from a sensor associated with the vehicle controlled by the haptic steering wheel. For example, in some embodiments, the sensor may comprise: a fuel sensor, a blind spot sensor, a speed sensor, a back-up sensor, an engine needs service sensor, an emissions sensor, a timer, a shift sensor, a GPS or other location sensor, or some other sensor known in the art. In some embodiments, the processor may receive a message comprising sensor data from a plurality of sensors; in other embodiments the processor may receive a message comprising sensor data from just one sensor. The processor is configured to compare the sensor data to a data quality metric. Based on this comparison, the processor determines a data quality for the sensor signal. Then, based on the data quality, the processor determines a haptic effect.

The haptic steering wheel further comprises housings 604a and 604b, which comprise haptic effect generators. For example, in some embodiments the haptic effect generators may comprise: a piezoelectric actuator, an electric motor, an electro-magnetic actuator, a voice coil, a linear resonant actuator, a shape memory alloy, an electro-active polymer, a solenoid, an eccentric rotating mass motor (ERM), a linear resonant actuator (LRA), or an electrostatic display. The haptic effect generators are configured to receive a haptic signal from the processor, and in response, output a haptic effect. In some embodiments, haptic steering wheel 602 may comprise greater or fewer haptic effect generator housings than shown in FIG. 6. Additionally, in some embodiments, the haptic effect generators may be placed in different positions than those shown by FIG. 6.

In one embodiment, haptic steering wheel 602 may be associated with both a speed sensor and a GPS sensor. In such an embodiment, a speed sensor transmits a message comprising sensor data corresponding to the vehicle's speed to the processor. At the same time the GPS sends a GPS signal to the processor associated with the vehicle's location, and the speed limit on that type of road. In such an embodiment, the user may enter a data quality metric associated with the user's preferred speed with relation to the speed limit on the road on which the user is driving. For example, the user may enter a data quality metric associated with the user's desire to never drive over the speed limit. In such an embodiment, when the user is driving the processor may determine data quality associated with the user's speed as compared to the speed limit on the road. Based on this data quality the processor will determine a haptic effect associated with the data quality. For example, if the user is going over the speed limit the processor may determine a haptic effect to alert the user that the user is speeding. The processor may further determine a haptic effect that increases as the user's speed increases. In another embodiment, the processor may determine a similar haptic effect if the user is traveling under the speed limit. In another embodiment, the processor may further take into account data from another sensor which detects driving conditions, for example: rain, snow, ice, temperature, and traffic, and associate this with the data quality.

In other embodiments, the haptic steering wheel may be used with different combinations of sensors and alerts. For example, the haptic steering wheel may be associated with a fuel sensor. In such an embodiment, the user may enter a data quality metric associated with the minimum fuel level that the user wants to have. In such an embodiment, the processor may determine a haptic effect that becomes more intense the further the fuel level goes below the user-defined level. In another embodiment, the sensor may be configured to detect when the vehicle needs service, for example an oil change. In such an embodiment, the processor may determine a haptic effect once the vehicle needs service. In some embodiments, the processor may further determine a haptic effect that increases in intensity if the user continues to drive beyond the point where the vehicle required service. In still another embodiment, the sensor may be associated with a blind-spot or backup sensor. In such an embodiment, the processor may determine a haptic effect whenever there is another vehicle in the vehicle's blind spot. In such an embodiment, the processor may further determine a more intense haptic effect if the user starts to merge the vehicle towards the blind spot. In still another embodiment, the haptic steering wheel may comprise a touch-sensitive interface (not shown in FIG. 6). In such an embodiment, the user may use the touch-sensitive interface to control a multifunction display that shows status information associated with the vehicle. In some embodiments, the multifunction display may comprise an LCD display or a heads-up display. For example, the user may use the touch-sensitive interface to adjust which of multiple gauges are displayed by the multifunction display, for example gauges associated with: fuel level, engine temperature, outside temperature, oil pressure, battery voltage, tachometer, traction control status, or some other gauge known in the art. In such an embodiment, each gauge may come with a preloaded default data quality metric, such as a minimum and/or maximum level. In such an embodiment, when that gauge surpasses its minimum and/or maximum, the processor will override the gauge the user has selected, and display the gauge that has surpassed its maximum and/or minimum level. In such an embodiment, the processor may further determine a haptic effect to alert the user to the change. For example, a user may choose to view the battery voltage on the multifunction display. But the fuel level gauge may comprise a data quality-metric such that when the fuel level falls below ¼ of a tank, the processor determines that the fuel gauge overrides the battery voltage and is displayed to the user via the multifunction display. In such an embodiment, the processor may further determine a haptic effect to alert the user to the change.

Figure 7A:
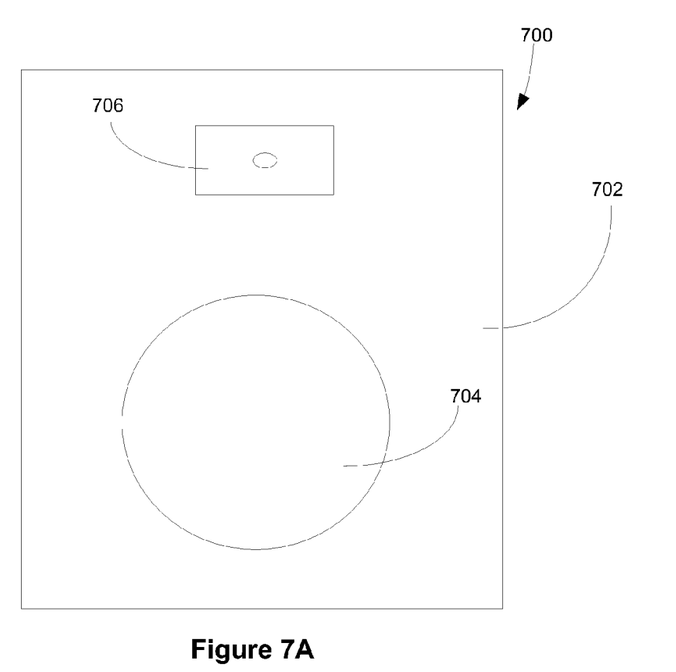
FIG. 7A is an illustration of a system for haptic information preview according to one embodiment of the present invention.

FIG. 7A is an illustration of a system for haptic information preview according to one embodiment of the present invention. FIG. 7A shows one side of haptic doorknob 700. Haptic doorknob 700 comprises faceplate 702, doorknob 704, and sensor 706. Faceplate 702 is configured to act as a mount for the haptic doorknob. Faceplate 702 may be constructed from one of many types of metals, for example: brass, bronze, nickel, or stainless steel. In other embodiments, faceplate 702 may be constructed from a combination of metals, a plastic, or a composite.

Haptic doorknob 700 further comprises a doorknob 704. Doorknob 704 is configured to be turned by a user, and in response, open a door. FIG. 7A shows doorknob 704 as a round ball. In other embodiments, doorknob 704 may take a different shape, for example, an egg shape or a mortise latch. In some embodiments, doorknob 704 may be constructed from a material similar to the materials discussed above for faceplate 702.

Haptic doorknob 704 further comprises a sensor 704. In other embodiments, sensor 704 may be placed in a different location, for example near the eyehole on the door, or in some other location associated with the entrance. Sensor 704 may comprise one or more of many different types of sensors, for example, a temperature sensor, a precipitation sensor, or an optical sensor. Sensor 704 is configured to transmit a message comprising sensor data to the processor. The processor is configured to compare the sensor signal to a data quality metric. Then, based on this comparison, the processor is configured to determine a data quality associated with the sensor data. For example, in one embodiment, sensor 706 may comprise a temperature sensor and the data quality metric may comprise a user-defined temperature, for example, the temperature at which the user should wear a jacket. In such an embodiment, the processor may determine a high or low data quality based on the comparison of the user's predefined temperature with the temperature measured by sensor 706. In another embodiment, sensor 706 may comprise a precipitation sensor, and the data quality metric may comprise a metric associated with precipitation. For example, the data quality metric may be associated with a level of precipitation at which the user should bring an umbrella. In such an embodiment, the processor may determine a data quality associated with the amount of precipitation. In yet another embodiment, sensor 706 may comprise an optical sensor. In such an embodiment, processor may comprise facial recognition software, and the data quality metrics may be associated with the faces of the user's acquaintances. In such an embodiment, the processor may determine the data quality by comparing the face of the person at the door to the quality metrics. In such an embodiment, a well-known person, such a close friend may receive a high data quality whereas an unexpected visitor, such as a salesman, may receive a low data quality. In some embodiments, the haptic doorknob may be equipped with a "do not disturb" setting. In do not disturb mode, the data quality applied to any visitor may be set to the lowest setting. Such an embodiment may also be applicable to an interior door, for example the door on a restroom.

Once the processor determines a data quality, it determines a haptic effect based at least in part on the data quality. For example, in one embodiment the processor may determine a strong haptic effect for a high data quality. In such an embodiment, the processor may determine a weak haptic effect, or no haptic effect, for low data quality. For example, in an embodiment wherein the sensor comprises an optical sensor and the processor comprises facial recognition software, if the user has defined a data quality metric associated with the person at the door, the processor may determine a strong haptic effect to alert users to open the door. In such an embodiment, when the processor determines that a visitor with a high data quality, such as an expected visitor or friend, has arrived, the processor may determine a gentle vibration. In some embodiments, the user may preprogram a distinct haptic effect for a set of known users. In such an embodiment, the processor may determine the preprogrammed haptic effect each time the processor detects that a known visitor has arrived. Further, in such an embodiment, when the processor determines a low data quality, for example when the sensor detects an unexpected or uninvited visitor, the processor may determine an unpleasant vibration, for example an intense or high frequency vibration to alert the user not to open the door. In another example, in an embodiment wherein the sensor comprises a temperature sensor, the processor may determine a stronger haptic effect for exterior temperatures that are well above or well below room temperature. Such an embodiment may alert the user that he or she should prepare for the temperature change.

Figure 7B:
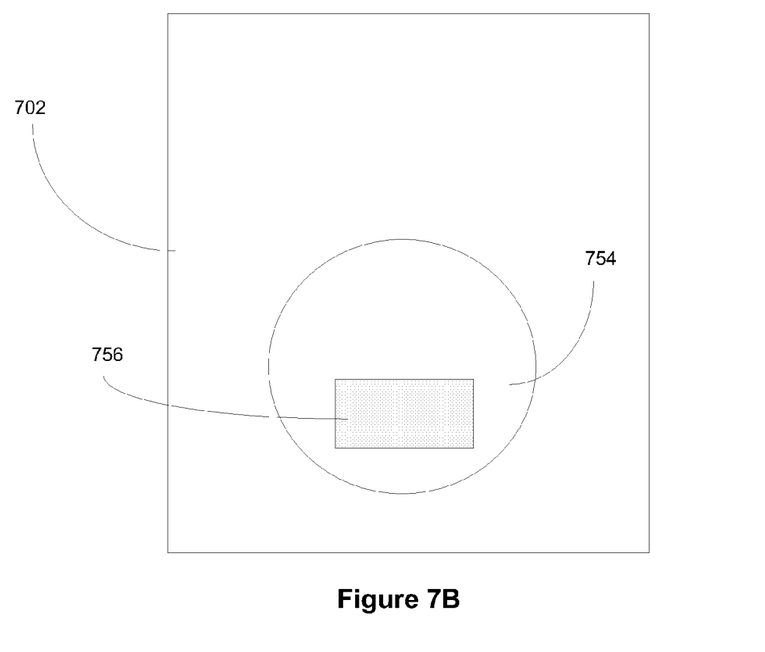
FIG. 7B is an illustration of a system for haptic information preview according to one embodiment of the present invention.

FIG. 7B is an illustration of a system for haptic information preview according to one embodiment of the present invention. FIG. 7B shows the side of haptic doorknob opposite the side shown in FIG. 7A, discussed above. As shown in FIG. 7B, haptic doorknob 700 comprises faceplate 702 (discussed with regards to FIG. 7A above), doorknob 754, and haptic effect generator housing 756. Doorknob 754 is configured to open the door when turned by the user. In some embodiments doorknob 754 is configured to turn when doorknob 704 turns. In some embodiments, haptic doorknob 700 further comprises a locking mechanism (not shown in FIGS. 7A and 7B). For example, in some embodiments, the locking mechanism may comprise a locking mechanism commonly used on an external door.

Doorknob 754 comprises an haptic effect generator housing 756. Haptic effect generator housing 756 comprises an haptic effect generator configured to receive the haptic signal from the processor, and generate a corresponding haptic effect. In some embodiments, the haptic effect generator may comprise: a piezoelectric actuator, an electric motor, an electro-magnetic actuator, a voice coil, a linear resonant actuator, a shape memory alloy, an electro-active polymer, a solenoid, an eccentric rotating mass motor (ERM), or a linear resonant actuator (LRA). In some embodiments, the processor may not output the haptic effect until the user is in contact with the haptic doorknob. In other embodiments the processor may output the haptic effect until the user touches doorknob 754.

Advantages of Systems for Haptic Information Preview

Systems of haptic information preview provide users with many advantages. For example, embodiments of haptic information preview give users the ability to determine whether a message is important without having to look at the message. This saves a user the time of having to open their e-mail account to read an unimportant e-mail. This embodiment may be particularly useful for a user that receives many e-mails every day. Other embodiments of haptic information preview allow users to determine important information without having to look at a separate gauge. This may increase user safety when the user is driving a car or taking part in some other activity, from which the user cannot safely be distracted.

General Considerations

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, a haptic effect selection routine, and suitable programming to produce signals to generate the selected haptic effects as noted above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed is:

1. A system comprising:
    a processor configured to:
        receive a message comprising data,
        receive a data quality metric associated with the data,
        determine a quality of the data based at least in part on the data quality metric and the contents of the data,
        determine a haptic effect based at least in part on the quality of the data, and
        transmit a haptic signal; and
    a haptic effect generator in communication with the processor and configured to:
        receive the haptic signal from the processor, and
        output a haptic effect based at least in part on the haptic signal.

2. The system of claim 1, wherein the processor receives the data quality metric from a local data store.

3. The system of claim 1, wherein the data quality metric is a user defined value.

4. The system of claim 1, wherein the data quality metric is a default value.

5. The system of claim 1, wherein the processor receives the data quality metric from a network connection.

6. The system of claim 1, further comprising a sensor configured to transmit the message to the processor.

7. The system of claim 1, further comprising a manipulandum configured to transmit interface signals to the processor.

8. The system of claim 7, wherein the manipulandum comprises a touch-sensitive interface.

9. The system of claim 8, wherein the touch-sensitive interface comprises a touch-screen.

10. The system of claim 7, wherein the haptic effect is output onto the manipulandum.

11. The system of claim 10, wherein the manipulandum comprises a haptic mouse.

12. The system of claim 10, wherein the manipulandum comprises a haptic steering wheel.

13. The system of claim 10, wherein the manipulandum comprises a haptic doorknob.

14. The system of claim 1, further comprising a display in communication with the processor, and wherein the processor is further configured to transmit display signals to the display.

15. The system of claim 14, wherein the processor is configured to display a portal and wherein the haptic effect is associated with the portal.

16. The system of claim 1, further comprising a housing, and wherein the haptic effect generator and the processor are mounted inside the housing.

17. The system of claim 16, wherein the housing is a mobile device housing.

18. A method comprising:
    receiving a message comprising data;
    comparing the data to a data quality metric associated with the data;
    determining a quality of the data based at least in part on the comparison of the contents of the data to the data quality metric;
    determining a haptic effect based at least in part on the quality of the data; and
    transmitting a haptic signal corresponding to the haptic effect to a haptic effect generator configured to output the haptic effect.

19. The method of claim 18, wherein the data quality metric is user-defined.

20. The method of claim 18, wherein the message is received from a sensor.

21. The method of claim 18, wherein the message is an e-mail.

22. The method of claim 18, further comprising detecting a user interaction with a manipulandum.

23. The method of claim 18, further comprising detecting a user interaction with an icon on a display.

24. The method of claim 22, wherein the haptic effect is determined based at least in part on the user interaction.

25. A non-transient computer readable medium comprising program code configured to:
   receive a message comprising data;
   receive a data quality metric associated with the data;
   determine a quality of the data based at least in part on the data quality metric and the contents of the data;
   determine a haptic effect based at least in part on the data quality; and
   transmit a signal corresponding to the haptic effect to a haptic effect generator configured to output the haptic effect.

26. The non-transient computer readable medium of claim 25, wherein the message is received from a sensor.

27. The non-transient computer readable medium of claim 25, wherein the message is an email.

* * * * *